United States Patent [19]

Puydak et al.

[11] Patent Number: 4,593,062
[45] Date of Patent: Jun. 3, 1986

[54] DYNAMICALLY CURED THERMOPLASTIC OLEFIN POLYMERS

[75] Inventors: Robert C. Puydak, Cranbury; Donald R. Hazelton, Chatam, both of N.J.

[73] Assignee: Exxon Research & Engineering Co., Florham Park, N.J.

[21] Appl. No.: 679,827

[22] Filed: Dec. 10, 1984

[51] Int. Cl.$^4$ .............. C08L 23/26; C08L 9/00; C08L 11/00

[52] U.S. Cl. .................... 524/426; 524/425; 524/519; 525/192; 525/193; 525/194; 525/215; 525/232; 525/237

[58] Field of Search .............. 525/240, 192–194, 525/232, 237, 215; 524/426

[56] References Cited

U.S. PATENT DOCUMENTS

| 3,037,954 | 6/1962 | Gessler et al. | 525/141 |
|---|---|---|---|
| 3,592,881 | 7/1971 | Ostapchenko | 525/232 |
| 3,904,470 | 9/1975 | Fukuki et al. | 525/240 |
| 4,087,485 | 5/1978 | Huff | 525/240 |
| 4,104,210 | 8/1978 | Coran et al. | 525/232 |
| 4,130,534 | 12/1978 | Coran et al. | 525/232 |
| 4,202,801 | 5/1980 | Peterson | 525/232 |
| 4,212,787 | 7/1980 | Matsuda et al. | 525/232 |
| 4,348,266 | 9/1982 | Coran et al. | 204/159.2 |
| 4,350,795 | 9/1982 | Bohm et al. | 525/194 |

FOREIGN PATENT DOCUMENTS 8145741  8/1983  Japan ................... 525/240

*Primary Examiner*—Carman J. Seccuro
*Attorney, Agent, or Firm*—Harvey L. Cohen

[57] ABSTRACT

Thermoplastic compositions useful as molded parts including automotive hoses and exterior body parts which exhibit good flow and good surface characteristics in injection molded parts. The compositions comprise equal proportions of a polyolefin, a halogenated butyl rubber and polychloroprene wherein the rubbers have been dynamically vulcanized to a fully cured state in the presence of the polyolefin.

31 Claims, No Drawings

DYNAMICALLY CURED THERMOPLASTIC OLEFIN POLYMERS

BACKGROUND OF THE INVENTION

In recent years there has been a significant commercial interest in polymer blends which have a combination of both elastic and thermoplastic properties. These polymer blends have been given the generic designation of Thermoplastic Olefins ("TPO"). They exhibit some of the properties of a cured elastomer as well as the reprocessibility of thermoplastic resins. The elastomeric characteristics are enhanced if one component of the blend is a vulcanizable elastomer which is wholly or partially crosslinked.

The earliest work in the curing of TPO compositions areas was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler, '954 discloses compositions comprising polypropylene and a rubber wherein the rubber can be, inter alia, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. Nos. 3,758,643 and 3,806,558 disclose TPO type polymers comprising an olefin resin and olefin copolymer rubber wherein the rubber is dynamically cured to a partial cure state. These compositions are reprocessible and result in molded products having good surface appearance. However, the potential applications of these products is limited because of high compression set and/or low softening temperatures resulting from only a partial cure of the rubber. Furthermore, the partial peroxide cure utilized is difficult to control from the standpoint of completeness of reaction, resulting in batch to batch variations in product properties.

U.S. Pat. No. 4,130,534 discloses TPO blends which comprise a polyolefin resin and a butyl rubber wherein the blend comprises up to 60 wt% of polyolefin resin and 40 wt% or more of a rubber. The butyl rubbers which can be utilized include butyl rubber per se as well as chlorinated or brominated butyl rubber. In the preferred embodiment, the polyolefin resin comprises 20 to 45 wt% of the blend and the rubber comprises about 80 to 55 wt% of the blend. The rubber is said to be fully cured, the cure being a dynamic vulcanization.

U.S. Pat. No. 4,130,535 discloses TPO compositions wherein the rubber component is an ethylene propylene copolymer ("EPM") or terpolymer ("EPDM"). The preferred thermoplastic polyolefin resins are polypropylene and polyethylene. The compositions comprise about 75 to about 25 wt% polyolefin resin and about 25 to about 75 wt% rubber. The rubber is dynamically cured to a fully cured state. Similar compositions are disclosed in U.S. Pat. No. 4,311,628 wherein the cure system for the rubber is a metal activated haloresin cure, e.g., brominated dimethylol phenol resins.

These TPO systems wherein the rubber is fully cured have the disadvantage that, as a result of poor flow characteristics, injection molded components made from these TPO's exhibit "flow line" imperfections. As a consequence special mold designs are required to minimize the problem, especially for large parts. Applications are further limited because of the high Shore A hardness of the composition.

U.S. Pat. No. 4,409,365 discloses TPO compositions in which a polyolefin resin is combined with an EPDM and a nitrile rubber. The rubbers are vulcanized and the product is said to have improved oil resistance.

U.S. Pat. No. 3,081,279 discloses compositions wherein a rubber such as butyl rubber is combined with a sulfochlorinated-polyolefin resin and cured. The uncured blend is said to have improved processing characteristics.

U.S. Pat. No. 2,369,471 disclosed blends of ethylene polymers with various hydrocarbon rubbers and halogenated rubbers. The compositions are either uncured or compression molded vulcanizates.

U.S. Pat No. 4,302,557 discloses a shrink film which comprises an EPM or EPDM rubber and a low density polyethylene or soft ethylene copolymer such as ethylene vinylacetate. Alternatively, the polymer blends can include polypropylene or high density polyethylene (HDPE). Another variant of the disclosed composition comprises the ethylene copolymer rubber with the polypropylene or HDPE. The rubber can be unvulcanized or, in the alternative a film of the blend is prepared and radiation cross-linked to form a heat shrinkable film.

U.S. Pat. No. 4,212,787 discloses a combination of a peroxide curable rubber and a peroxide decomposible polyolefin resin which may, alternatively have incorporated therein a non-peroxide curable rubber such as polyisobutylene. The peroxide curable rubber is preferably an ethylene propylene rubber (EPR) and the peroxide decomposible polymer is preferably polypropylene. The curable rubber is partially cured in the manner of U.S. Pat. No. 3,866,558, supra. The partial curing can be carried out in the presence of divinyl benzene. The product is said to have improved flexibility and rebound elasticity. The compositions comprise about 100 to 5 parts by weight of a partially cured elastomer which is prepared by the dynamic heat treatment in the presence of a peroxide of a mixture of 100 to 40 parts by weight of (a) peroxide-curable olefin copolymer rubber and 0 to 60 parts by weight of (b) a peroxide-decomposible olefin plastic; and 5 to 100 parts of at least one (c) peroxide non-curable hydrocarbon rubber.

U.S. Pat. No. 4,202,801 discloses dynamically partially cured blends of EPM or EPDM with a resin (Polyethylene or polypropylene) and a conjugated diene rubber, e.g., polychloroprene. The composition is a typical TPO. While polychloroprene is disclosed as one of the conjugated diene rubbers, it is one of many rubbers disclosed, and no preference is taught nor do any examples illustrate the use of polychloroprene or any benefit derived therefrom.

U.S. Pat. No. 4,348,266 discloses, inter alia, an elastoplastic composition which can comprise 20–45 parts of polyethylene and 80 to 55 parts of polychloroprene. The preferred embodiment is cured by irradiation. A comparison is made with a control which is chemically cured by dynamically vulcanizing a PE/polychloroprene blend wherein the curative system is ZnO, benzothiazyldisulfide and m-phenylene bismaleimide.

Other TPO compositions have been prepared utilizing a thermoplastic polyolefin resin in conjunction with a rubber. U.S. Pat. No. 4,104,210 discloses compositions wherein the rubber is a diolefin rubber, e.g., natural rubber, polyisoprene, nitrile rubber or styrene butadiene rubber. The rubber is fully cured. U.S. Pat. No. 4,211,049 discloses particular curatives for the TPO compositions containing diolefin rubbers, e.g., phenolic curvatives, urethane curatives and certain sulfur donor curatives. U.S. Pat. No. 4,141,878 discloses TPO compositions wherein the rubber is cross-linked chlorosulfonated polyethylene.

The TPO compositions of the prior art are either compositions in which the rubber component is uncured or partially cured and have low tensile strength and high compression set or are compositions containing a fully cured rubber portion and consequently are high in hardness and have poor flow characteristics when injection molded, resulting in flow lines in the finished product.

Various other compositions of resins with rubbers are taught in the art. The resins are generally polyethylene or polypropylene.

U.S. Pat. No. 3,407,253 discloses a blend of a crystalline polyolefin, e.g., polypropylene with a rubber, e.g., butyl rubber which is alleged to have voids when the polyolefin is stretched. The elastomer is unvulcanized. The product is non-transparent and has a leather like feel.

U.S. Pat. No. 3,597,372 discloses a blend of a thermoplastic and a rubber, e.g., polypropylene with neoprene. The rubber is cross-linked by chemical means or with irradiation. The composition, when formed into articles and cured, exhibit shrink properties.

U.S. Pat. No. 3,701,702 discloses compositions of about 2 to about 30 wt% of a fiber forming thermoplastic resin, e.g., polypropylene and an elastomer, e.g., polychloroprene. The resin and elastomer are thoroughly blended above the melting point of the resin, cooled below the melting point of the resin and curatives added. The composition is then shaped and free cured without pressure restraint.

U.S. Pat. No. 3,965,055 discloses blends of vulcanizable rubbers with a resin, e.g., polypropylene. The vulcanizable rubbers can include polychloroprene and butyl rubber blends. The resin is dispersed throughout the continuous rubber phase and has a particle size of cross section of about 0.5 microns or less and an L/D ratio of at least 2. The compositions can be blended with curatives formed and vulcanized by free curing without pressure restraint.

U.S. Pat. No. 4,005,054 discloses a vulcanizable composition comprising a resin and a rubber wherein the resin can be polypropylene and the rubber can be polychloroprene. The composition is processed so that the resin is formed into fibrils of less than 5 microns in diameter. The product is said to resist elongation in one direction.

SUMMARY OF THE INVENTION

It has surprisingly been found that a TPO having good physical strength characteristics coupled with excellent processibility, excellent flow characteristics, good oil resistance and low compression set can be prepared from a blend of a thermoplastic olefin resin and two rubber components. The unexpected result is achieved by selecting as rubbers halogenated butyl rubber and polychloroprene. The rubbers are blended with the resin and dynamically cured, preferably using a ZnO cure system.

By selecting polypropylene or high density polyethylene as the thermoplastic olefin resin the compositions exhibit good high temperature properties. The compositions of this invention, because of their increased tensile, excellent flow characteristics and low compression set are useful as molded and extruded articles, especially where good surface appearance of the article is important, e.g., exterior automotive parts.

DETAILED DESCRIPTION

This invention relates to improved TPO composition. In particular it relates to compositions of a polyolefin resin and two rubbers one of which is a halogenated butyl rubber, the other rubber is a polychloroprene. The vulcanization of the rubber is accomplished by dynamic vulcanization.

As used in the specification and claims, the term "dynamic vulcanization" means a vulcanization process for a rubber-containing TPO composition wherein the rubber is vulcanized under conditions of high shear. As a result, the rubber is simultaneously crosslinked and dispersed as fine particles of a "micro-gel" within a polyolefin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin screw extruders. The unique characteristic of the dynamically cured compositions is that, notwithstanding the fact that the rubber component is fully cured, the compositions can be processed and reprocessed by conventional rubber processing techniques such as extrusion, injection molding, compression molding, etc. Scrap or flashing can be salvaged and reprocessed.

The term "dynamically vulcanized alloy" (DVA) as used in the specification and claims means a composition comprising a thermoplastic polyolefin resin and a rubber wherein the rubber component has been dynamically vulcanized to a fully cured state. The compositions are generally prepared by blending together the polyolefin resin and rubbers with curatives and fillers under conditions of dynamic vulcanization.

In preparing the preferred DVA compositions of this invention at least one polyolefin resin is blended with a halogenated butyl rubber and a polychloroprene rubber. The preferred polyolefin resins are high density polyethylene (HDPE) and polypropylene. While other polyolefin homopolymers and copolymers of ethylene can be utilized in the practice of this invention, the resulting DVA compositions are deficient in high temperature characteristics. Such other polyolefins include low density polyethylene (LDPE), linear low density polyethylene (LLDPE) and polybutylene (PB), as well as copolymers of ethylene with vinylacetate, acrylic acid, methyl acrylate, ethyl acrylate, etc. However, these other polyolefin resins can be incorporated into the DVA compositions of this invention along with the polypropylene ("PP") or polyethylene ("PE"). As used in the specification and claims, the term "polypropylene" includes homopolymers of propylene as well as reactor copolymers of polypropylene (RCPP) which can contain about 1 to about 20 wt% ethylene or an alpha olefin comonomer of 4 to 16 carbon atoms. The polypropylene can be highly crystalline isotactic or syndiotactic polypropylene. The RCPP can be either a random or block copolymer. The density of the PP or RCPP can be about 0.80 to about 0.9 g/cc; generally, about 0.89 to about 0.91 g/cc.

High density polyethylene (HDPE), useful as the polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Polyolefin resins which can optionally be included in the compositions of this invention include polybutylene, LDPE and LLDPE as well as copolymers of ethylene with unsaturated esters of lower carboxcylic acids. The term "polybutylene" generally refers to thermoplastic resins of both poly(1-butene)homopolymer and the copolymer with, for example, ethylene, propylene, pentene-1, etc. Polybutylene is manufactured via a stereospecific Ziegler-Natta polymerization of monomer(s). Commercially useful products are of high molecular weight and isotacticity. A variety of commercial grades of both homopolymer and ethylene copolymer are available with melt indices that range from about 0.3 to about 20 g/10 min.

The term "low density polyethylene" or "LDPE" as used in the specification and claims mean both low and medium density polyethylene having densities of about 0.910 to about 0.940 g/cc. The terms include linear polyethylene as well as copolymers of ethylene which are thermoplastic resins.

Linear low density polyethylene (LLDPE) is a relatively new class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

The rubbers which can be used in the practice of this invention are halogenated butyl rubber and polychloroprene.

Butyl rubber is a copolymer of an isoolefin and a conjugated multiolefin. The useful copolymers comprise a major portion of isoolefin and a minor amount, preferably not more than 30 wt%, of a conjugated multiolefin. The preferred copolymers comprise about 85-99.5 wt% (preferably 95-99.5 wt%) of a $C_4$-$C_7$ isoolefin, such as isobutylene, and about 15-0.5 wt% (preferably about 5-0.5 wt%) of a multiolefin of about 4-14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608-609, etc. The term "butyl rubber" as used in the specification and claims includes the aforementioned copolymers of an isoolefin having 4-7 carbon atoms and about 0.5 to 20 wt% of a conjugated multiolefin of about 4-10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and percipitates out of solution as fine particles. The polymerization is generally carried out at temperatures of about −90° C. to −100° C. See U.S. Pat. Nos. 2,356,128 and 2,356,129 incorporated herein by reference.

The polymerization process which is carried out in a draft tube reactor is continuous. Monomer feed and catalyst are continuously introduced at bottom of the draft tube where an axial flow pump is located. The pump circulates the slurry at high velocity to provide efficient mixing and heat transfer. Polymer slurry containing about 20-30 wt% butyl rubber continuously overflows from the reactor through a transfer line.

Where the desired product is the butyl rubber itself, the slurry is fed through the transfer line to a flash drum operated at about 140-180 PA (1.38-1.58 atm) and 65°-75° C. Steam and hot water are mixed with the slurry in a nozzle as it enters the drum to vaporize methyl chloride and unreacted monomers which pass overhead and are recovered, and the polymer is finished by water removal and drying. Where, however, it is desired to produce a halogenated butyl rubber, this can be accomplished by preparing a solution of the rubber. Of course, any halogenation technique may be utilized.

In the preferred method of halogenation a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The polyolefin resin component of the DVA composition of this invention comprises about 25 to about 100 wt% of polypropylene or high density polyethylene; preferably about 35 to about 100 wt% PP or HDPE; more preferably about 45 to about 100 wt%, e.g., 45 to about 90 wt%. While blends of PP or HDPE may be used, each of these polymers are selected for their high temperature properties and no particular advantage is seen in blends thereof. The optional aforedescribed polyolefin resins which can be blended with the PP or HDPE comprise about 0 to 75 wt% of the polyolefin resin component of the DVA. When the optional polyolefin resin is used, it is preferably incorporated into the blend at about 10 to about 55 wt%; more preferably about 15 to about 35 wt% of the polyolefin resin component is the optional polyolefin resin. In the preferred embodiment of this invention, polypropylene is used alone as the polyolefin resin.

In the practice of this invention, the polyolefin resin, the halogenated butyl rubber and the polychloroprene are preferably utilized in substantially equal proportions. The term "substantially equal proportions" as used in the specification and claims with respect to the polyolefin and rubbers means that each of the rubbers are incorporated in the DVA at about 90 to 110 wt% based on the polypropylene fraction of the polymer blend. For example, where the polypropylene is present in the DVA at about 20 wt% based on the overall DVA composition, the halogenated butyl rubber and the polychloroprene can each be present at about 18 to about 22 wt%. The term "polymer blend" as used in the specification and claims means the blend of polyolefin and rubbers.

The polychloroprene rubber is the primary contributor to oil resistance of the DVA composition of this invention. It should comprise at least 35 wt% of the halogenated butyl rubber plus polychloroprene rubber. On the other hand, polychloroprene is not ordinarily compatible with polyolefin resins while halogenated butyl rubber is. The halogenated butyl rubber serves to "compatibilize" the polychloroprene with the polyolefin and should be present at, at least 25 wt% based on the total rubber. Hence, the halogenated butyl rubber can comprise about 25 to about 65 wt% percent of the total rubber in the DVA composition. Preferably, each of the rubbers comprise about 35 to about 65 wt% of the total rubber. It will be evident from the aforegoing disclosure that a novel aspect of this invention is the discovery that a rubber which is not normally compatible with a resin polymer can be made so by blending it with a minor amount of a second rubber which is compatible with the resin.

The polymer blend comprises about 40 to about 70 wt% of the overall DVA composition. Each component of the polymer blend can comprise about 12 to about 35 wt% of the DVA. Preferably each of the rubbers and the polyolefin comprise about 13.5 to about 25 wt% of the DVA composition, more preferably about 15 to about 22 wt% of the DVA, e.g., about 16 to about 19 wt%.

In addition to its polymer component, the DVA composition of this invention can include fillers, antioxidants, stabilizers, rubber processing oils, lubricants (e.g., oleamide), antiblocking agents, waxes, foaming agents, pigments, coupling agents for the fillers and other processing aids known to the rubber compounding art. Metal oxides, e.g., MgO, can be included to act as acid acceptors. The pigments and fillers can comprise up to 30 wt% of the total DVA composition based on polymer component plus additives. Preferably the filler comprises about 10 to about 30 wt% based on the DVA composition, more preferably about 12 to about 25 wt% of the overall composition.

Fillers can be inorganic fillers such as calcium carbonate, clays, silica or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, and can be defined as the ratio, by weight, of process oil to the rubber in the DVA which is to be dynamically vulcanized. This ratio can vary from about 0.3/1 to about 1.3/1; preferably about 0.4/1 to about 1/1; more preferably about 0.5/1 to about 0.75/1. Oils other than petroleum based oils such as oils derived from coal tar and pine tar can also be utilized. In addition to the petroleum derived rubber process oils, organic esters and other synthetic plasticizers can be used. As used in the specification and claims, the term "process oil" means both the petroleum derived process oils and synthetic plasticizers.

The process oil is an essential ingredient of the DVA to insure that the DVA has good flow properties, e.g., spiral test flow reading of at least 16 cm. The quantity of oil utilized will depend in part on the amount of polymer blend and filler used as well as, to some extent, the type of cure system utilized. Generally, the process oil will comprise about 20 wt% of the DVA. Larger amounts of process oil can be used, the deficit being reduced physical strength of the DVA.

Where the polyolefin resin comprises a blend of one or more optional polyolefin resins in addition to the PP or HDPE, the process oil content of the DVA can be reduced proportionately without detrimental effect on the surface characteristics or flow properties of the DVA. For example, where the polyolefin resin comprises about 30 wt% of optional polyolefin resins with PP or HDPE, the oil content can be reduced from about 20 wt% to about 15 wt% without adversely effecting the flow and surface properties of the DVA. In fact, it is preferred that in such an instance the process oil content be reduced since addition of the optional polyolefin resins into the composition results in lowering of physical properties. Reduction of the amount of process oil has a compensating effect. The preferred range of process oil content of the DVA is about 15 wt% to about 35 wt%, more preferably about 20 to about 25 wt% based on the overall DVA composition.

Antioxidants can be utilized in the composition of this invention—the particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis-(4-methyl-6-1, butylphenol); 2,6'-di-t-butyl-o-dimethylamino-p-cresol; hydroquinone monobenzyl ether, octylated diphenyl amine, phenyl-beta-naphthlylamine; N,N'-diphenylethylene diamine; aldol-alpha-naphthylamine; N,N'-di-phenyl-p-phenylene diamine, etc. The physical antioxidants include mixed petroleum waxes and microcrystalline waxes.

Any conventional cure system for the rubber to be dynamically vulcanized can be used except that peroxide cures are specifically excluded from the practice of this invention. Under conditions which would result in a fully cured rubber using peroxide, the polypropylene resin would depolymerize, thereby resulting in a lower strength composition having little temperature resistance. Otherwise, any particular curatives known in the art for the vulcanization of conjugated diene rubbers are suitable. These include sulfur cures as well as non-sulfur cures. For example, halogenated butyl rubber can be cured using zinc oxide alone. Of course, accelerators such as dithiocarbamates, thuirams, diamines and thioureas can be included in these zinc oxide cures. Zinc oxide free cures of halogenated butyl rubber known to the art can be utilized. For example, one such vulcanizing system comprises litharge, 2-mercaptoimidazoline and diphenyl guanidine.

Resin cures can be used for halogenated butyl rubber and polychloroprene rubber. The resins useful as curatives are phenolic resins, brominated phenolic resins, urethane resins, etc.

While phenolic resin cures are suitable cures, they impart a yellowish or orangish tinge to the rubber part. A preferred cure is one based on ZnO and/or MgO. Such cures permit the use of pigments such as $TiO_2$ to give bright white compositions. In the cure system, the MgO acts primarily, not as an accelerator, but as an acid acceptor to stabilize the rubber from dehalogenation.

In a preferred embodiment, the halogenated rubber to be vulcanized is chlorinated or brominated butyl rubber. Halogenated butyl rubbers are vulcanized with zinc chloride cures. Sulfur-bearing accelerators can be utilized with the zinc oxide.

Illustrative of accelerators which can be used in conjunction with ZnO for curing halobutyl rubber are 2,6-di-tert-butyl-para-cresol; N,N'-diethylthiourea; di-ortho-tolylguanidine; dipentamethylene thuiram tetrasulfide ethylene trithiocarbonate; 2-mercapto-benzothiazole; benzothiazole disulfide; N-phenyl-beta-naphtlylamine; tetramethyl thuiram disulfide, zinc diethyldithiocarbamate, zinc dibutyldithiocarbamate, and zinc dimethyldithocarbamate. Formulations for the ZnO cure of halobutyl rubber and polychloroprene are well known in the art. A preferred cure system comprises MgO, ZnO and zinc diethyldithiocarbamate since this system results in a vulcanized rubber with low compression set.

In the practice of this invention the polyolefin resin and rubbers are mixed together at a temperature sufficient to soften the resin or, more commonly, at a temperature above its melting point where the resin is crystalline at room temperature, e.g., PP. After the resin and rubbers are intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin (about 130° C. in the case of HDPE and about 165° C. in the case of PP) to about 250° C.; more typically, the temperature range is about 150° C. to about 230° C. Preferably the vulcanization is carried out at a temperature of about 180° C. to about 220° C.

It is preferred that the mixing process must be continued until vulcanization is complete. If vulcanization is permitted to continue after mixing has stopped, the composition will not be reprocessible as a thermoplastic. However, the dynamic vulcanization can be carried out in stages. For example, vulcanization can be commenced in a twin screw extruder and pellets formed of the DVA material using an underwater pelletizer thereby quenching the vulcanization before it is complete. It can be completed at a latter time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components are present in the mix prior to carrying out the dynamic vulcanization process of this invention, this is not a necessary condition. For example, in one embodiment the rubber to be cured can be dynamically vulcanized in the presence of some or all of the polyolefin resin. This blend can then be let down into additional polyolefin resin. Similarly, it is not necessary to add all of the fillers and oil prior to dynamic vulcanization. Some or all of the fillers and oil can be added after vulcanization is complete.

The term "fully vulcanized" as used in the specifications and claims with respect to the dynamically vulcanized rubber component of this invention means that the rubber component to be vulcanized has been cured to a state in which the physical properties of the rubber are developed to impart elastomeric properties to the rubber generally associated with the rubber in its conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber component of the blends to the extent that it contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that rubber component of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferredly $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation. *J. Rubber Chem. and Tech,* 30, p. 929. The appropriate Huggins solubility parameters for rubber-solvent pairs used in the calculation were obtained from the review article by Sheehan and Bisio, *J. Rubber Chem. & Tech.,* 39, 149. If the extracted gel content of the vulcanized rubber is low, it is necessary to use the correction of Bueche wherein the term v is multiplied by the gel fraction (%gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

A preferred composition of this invention comprises polypropylene as the polyolefin resin, in combination with chlorinated butyl rubber and polychloroprene, the rubbers are dynamically vulcanized utilizing a ZnO cure system which does not have a deleterious effect on the PP.

The advantages of this invention may be more readily appreciated by reference to the following examples. Mixing conditions used to prepare the DVA compositions are shown in Table I.

EXAMPLE I

Two DVA compounds were made using a reactor grade polypropylene, chlorinated butyl rubber and Neoprene ® W. The compounds differed primarily in polymer blend content and oil content. The compositions were dynamically cured with a zinc oxide/Permalux ® cure system using the procedure set forth in Table I.

The compositions of the instant invention were compared with Santoprene ® 201-73, a commercially available TPO manufactured by Monsanto Company. The Santoprene ® product is believed to be a blend of PP and an ethylene propylene-diene polymer (EPDM) wherein the EPDM component is fully cured. The comparison results are shown in Table II.

It is apparent Run b (within the scope of this invention) has superior flow characteristics, as shown by the spiral flow test, over the prior art (29½ vs. 16½). Additionally, it has improved oil resistance (37 vs. 62).

The blend containing 19 parts chlorinated butyl rubber, Neoprene ® W and PP with 20 parts of process oil had a slightly better flow (18 vs. 16½), but substantially improved physical properties. There was more than a 50% increase in tensile strength and about a 65% increase in tear strength.

EXAMPLE II

The DVA compositions of this invention were prepared using different cure systems. Table III shows a comparison of a Zinc Oxide/Thiuam-Thiazole cure with a zinc oxide/Permalux ® cure and a phenolic resin cure. Table IV shows a comparison of a zinc oxide/Permalux ® cure with a phenolic resin cure (SP1045) and a halogenated phenolic resin cure (SP1055).

All three cure systems produced snappy-rubbery DVA's with comparable physical properties. The Permalux ® and resin systems gave the best compression set values. The lightest color and smoothest molded surface was achieved with phenolic resin cures. The Permalux ® cure also exhibited the best oil resistance.

A comparison of the data presented in Table III shows that one part of Permalux ® gives an adequate cure and no benefit is achieved by using two parts of Permalux ® (Runs B, C and D). Excess zinc oxide detracted from tensile strength and oil resistance (Runs B and E). Variations in MgO content had a minimal effect on DVA properties (Table II B–D; Table IV).

It is evident from the data presented in Table IV that variations on the type of resin cure, unhalogenated (Runs B and C) or halogenated resin (D and E), had little effect on DVA properties. Similarly, differences in curing resin content (compare Runs B and C; D and E) had no appreciable effect on DVA properties.

EXAMPLE III

The DVA compositions of this invention were prepared in the manner of Example I at different polymer, filler oil levels and mineral filler content. The results are shown in Table V. Increasing oil level from 15 to 20 parts significantly improves flow characteristics of the DVA (Compare Run B with A and C). At the 20 wt% level, the flow exceeds that of commercial TPO's (18 vs. 16½), while tensile strength is reduced by increasing oil content. The DVA's of this invention have both better tensile and flow than prior art compositions.

EXAMPLE IV

A further comparison of the effect of oil level was made by preparing a DVA having 19 wt% each of polypropylene, polychloroprene and chlorinated butyl rubber and 17 wt% process oil. This master batch was divided into two parts; the one bath was tested for physical properties. The second batch was returned to the mixer and sufficient oil was added to increase the oil content of the blend to 33.6 wt%. The results are shown in Table VI, Runs A and B. A third blend containing 30 wt% oil and 17 wt% each of the polyolefin and rubbers was prepared for comparison purposes (Run C).

As can be seen from the data, increasing the oil content of the DVA from 17 wt% (A) to 33.6 wt% (B) increases the flow (9 vs. 29.5) and decreases the tensile (1730 vs. 980). While the effect of increasing oil content is expected, what is unexpected is that notwithstanding the substantially improved flow characteristics over the prior art (29.5 vs. 16.5). The tensile strength of the DVA (Run B) is equivalent to the prior art compound.

Run C, Table VI demonstrates that the oil content can be decreased slightly while increasing the polymer content without any substantial detriment to physical properties.

EXAMPLE V

DVA compositions were prepared using various grades of Neoprene and chlorinated butyl rubber. The results are shown in Table VII. The choice of lower or higher Mooney viscosity rubbers had a bigger effect on mixing characteristics than on physical properties. The combination of Chlorobutyl ®1068 and Neoprene ® WHV developed more heat and shear in mixing than that obtained with a combination Chlorobutyl ®1066 and Neoprene ® W. This suggests that by judiciously selecting the polymer grades used, good blending even in high oil content DVA (Run C) can be assured.

Brominated butyl rubber and chlorinated butyl rubber resulted in DVA's of substantially the same properties. See Runs D and E, Table VII.

EXAMPLE VI

DVA blends were prepared in the manner of Example I using different polyolefins to demonstrate the effect of polyolefin on DVA properties. As shown in Table VIII, by substituting a part of the PP with a softer copolymer (polybutene) a DVA having improved flow characteristics is obtained without altering the oil content. The effect of replacing 5 wt% of the PP with the polybutene on physical properties is similar to that obtained by increasing the oil content by 5 wt% (compare Tables V and VIII).

EXAMPLE VII

DVA compositions were prepared using three different oil types to evaluate their effect on product properties. The results are shown in Table IX. The naphthenic oil (A) and paraffinic oil (B) resulted in a compound of substantially similar properties. The paraffinic oil was more slowly incorporated into the blend than the naphthenic oil. Surprisingly, the tensile strength of the aromatic oil containing blend was substantially higher than that of the other blends. The paraffinic oil (Run B) resulted in a composition having improved flow.

TABLE 1

CHLOROBUTYL/PP/CHLOROPRENE DVA's - TYPICAL BANBURY MIX CYCLE

| Approximate Time, min. | Estimated Batch Temp., °C. (°F.) | Procedure |
|---|---|---|
| 0 | — | Load elastomers, olefin resin(s), MgO, antioxidants, filler, stearic acid. |
| 1-3 | 160-170 (320-340) | After flux add oil in increments. |
| 5-6 | 160-170 (320-340) | Add curatives. |
| 7-8 | 170-180 (340-360) | Watch for peak in power and torque indicating cure reaction. |
|  | 175-210 (350-420) | Allow 5 minutes to complete vulcanization and continue distribution of cured elastomer; adjust rotor speed or use cooling water to maintain batch in indicated temperature range. |
| 12-15 | 190-220 (380-440) | Dump |

TABLE II

COMPARISON OF PRIOR ART WITH DVA OF THIS INVENTION

|  | DVA A | DVA B | Prior Art |
|---|---|---|---|
| COMPONENT |  |  |  |
| CHLOROBUTYL 1066 | 19 | 15.2 | — |
| Dypro K222Z PPRC (1.5 MFR) | 19 | 15.2 |  |
| Neoprene W | 19 | 15.2 |  |
| Maglite KorD | 0.5 (K) | 3.2 (D) |  |
| Atomite (CaCO3) | 16.7 | 12.9 |  |
| Circosol 4240 oil | 20 | 33.6 |  |
| Irganoz 1010 | 0.1 | 0.1 |  |
| DLTDP | 0.2 | 0.2 |  |
| Stearic Acid | 0.5 | 0.4 |  |
| Curatives |  |  |  |
| Zinc Oxide | 4 | 4 |  |
| Permalux | 1 | 1.2 |  |
| Spiral Flow Test |  |  |  |
| Centimeters | 18 | 29½ | 16½ |
| Appearance |  |  |  |
| Color |  | Dark Brown | Beige |
| Surface |  | Smooth | Smooth |
| Physical Properties, Injection Molded |  |  |  |
| Shore A Hardness, Instantaneous | 79 | 66 | 68-72 |
| Shore D Hardness, Instantaneous | 25 | 17 | 16 |
| Tensile Strength, psi | 1460 | 980 | 903-970 |
| Ultimate Elongation, % | 180 | 210 | 117-140 |
| Tear, Die B, 15/inch | 191 | est. 120* | 114 |
| Flexural Modulus |  |  |  |
| Secant, psi | 7370 | est. 3500* | 4200 |
| Feel | Rubbery, snappy | Rubbery, snappy | Rubbery, snappy |
| Compression Set B, Plied |  |  |  |
| 22 Hrs. @ 100 C, % | 49 | 47 | 29 |
| Fluid Immersion, 70 Hrs @ 100 C |  |  |  |
| Volume Increase |  |  |  |
| Distilled Water, % | 6 | 13 | 12 |
| ASTM #3 oil, % | 61 | 37 | 62 |

*Similar formulation

TABLE III

CHLOROBUTYL/PP/CHLOROPRENE DVA's -CURE SYSTEM COMPARISON

| | Curative Type | | | | | |
|---|---|---|---|---|---|---|
| | Thiuram-Thiazole | Permalux | | | | Resin |
| | A | B | C | D | E | F |
| Component |  |  |  |  |  |  |
| CHLOROBUTYL 1066 | 19 | 19 | 19 | 19 | 19 | 19 |
| Dypro K222Z PPRC (1.5 MFR) | 19 | 19 | 19 | 19 | 19 | 19 |
| Neoprene W | 19 | 19 | 19 | 19 | 19 | 19 |

TABLE III-continued
CHLOROBUTYL/PP/CHLOROPRENE DVA's -CURE SYSTEM COMPARISON

| | Curative Type | | | | | |
|---|---|---|---|---|---|---|
| | Thiuram-Thiazole | Permalux | | | | Resin |
| | A | B | C | D | E | F |
| Maglite D | 4 | 4 | 4 | 1 | 4 | 4 |
| Atomite (CaCO3) | 13.2 | 14.2 | 15.2 | 17.2 | 9.2 | 12.7 |
| Circosol 4240 Oil | 17 | 17 | 17 | 17 | 17 | 17 |
| Irganox 1010 | 0.1 | 0.1 | 0.1 | 0.1 | 0.1 | 0.1 |
| DLTDP | 0.2 | 0.2 | 0.2 | 0.2 | 0.2 | 0.2 |
| Stearic Acid | 0.5 | 0.5 | 0.5 | 0.5 | 0.5 | 0.5 |
| Curatives | | | | | | |
| Zinc Oxide | 5 | 5 | 5 | 5 | 10 | 5 |
| TMTDS | 1 | — | — | — | — | — |
| MBTS | 2 | — | — | — | — | — |
| Permalux | — | 2 | 1 | 2 | 2 | — |
| SP-1045 Resin | — | — | — | — | — | 2.5 |
| Spiral Flow Test | | | | | | |
| Centimeters[1] | 11 | 9 | 8.5 | 10 | 10.5 | 9.5 |
| Appearance | | | | | | |
| Color | Brown | Brown | Tan | Dark Grey | Grey | Gold |
| Surface | Almost Smooth | Some Roughness, streaks | | | Almost smooth | Smooth |
| Physical Properties Injection Molded[2] | | | | | | |
| Shore A Hardness, Instantaneous | 87 | 81 | 86 | 85 | 80 | 82 |
| Shore D Hardness, Instantaneous | 27 | 29 | 28 | 30 | 28 | 28 |
| Tensile Strength, psi | 1570 | 1570 | 1730 | 1740 | 1450 | 1540 |
| Ultimate Elongation, % | 70 | 100 | 85 | 100 | 100 | 90 |
| Flexural Modulus | | | | | | |
| Secant, psi | 11,500 | 11,100 | 12,200 | 13,000 | 11,400 | 11,200 |
| Feel | | | Rubbery, Snappy | | | |
| Compression Set B, Plied | | | | | | |
| 22 Hrs. @ 100 C, % | 62 | 57 | 48 | 53 | 57 | 53 |
| Oven Aging, 7 Days @ 125 C | | | | | | |
| Shore A Hardness Change, Pts. | −1 | +6 | +1 | +3 | +8 | +2 |
| Tensile Change, % | +13 | +33 | +20 | +28 | +42 | +30 |
| Elongation Change, % | −6 | +10 | +9 | +20 | +10 | +22 |
| Fluid Immersion, 70 Hrs @ 100 C | | | | | | |
| Volume Increase | 11 | 6 | 5 | 11 | 8 | 10 |
| Distilled Water, % | 76 | 48 | 54 | 54 | 72 | 79 |

[1]Non-standard test for comparison purposes; higher values indicate better mold filling characteristics. Conditions using Boy laboratory injection press: pressure - 800 psi, barrel temperature 444 F. (230 C.), nozzle - 512 F. (267 C.), mold at 125 F. (52 C.); 13 sec inject., 20 sec. hold.
[2]Boy injection molding machine, temperature and times as above, pressure adjusted as necessary.

TABLE IV
CHLOROBUTYL/PP/CHLOROPRENE DVA'S - CURE SYSTEM COMPARISON

| | Curative Type | | | | |
|---|---|---|---|---|---|
| | Permalux | Resin | | | |
| | A | B | C | D | E |
| Component | | | | | |
| CHLOROBUTYL | 19 | 19 | 19 | 19 | 19 |
| Dypro K222Z PPRC (1.5 MFR) | 19 | 19 | 19 | 19 | 19 |
| Noerene W | 19 | 19 | 19 | 19 | 19 |
| Maglite k | 0.5 | 0.5 | 0.5 | 0.5 | 0.5 |
| Atomite (CaCO3) | 16.7 | 15.2 | 14.2 | 15.2 | 14.2 |
| Circosol 4240 Oil | 20 | 20 | 20 | 20 | 20 |
| Irganox 1010 | 0.1 | 0.1 | 0.1 | 0.1 | 0.1 |
| DLTDP | 0.2 | 0.2 | 0.2 | 0.2 | 0.2 |
| Stearic Acid | 0.5 | 0.5 | 0.5 | 0.5 | 0.5 |
| Curatives | | | | | |
| Zinc Oxide | 4 | 4[3] | 4[3] | 4[3] | 4[3] |
| Permalux | 1 | — | — | — | — |
| Sp-1045 Resin | — | 2.5 | 3.5 | — | — |
| Sp-1065 Resin | — | — | — | 2.5 | 3.5 |
| Spiral Flow Test | | | | | |
| Centimeters[1] | 18 | 16.5 | 17 | 16 | 17.5 |
| Appearance | | | | | |
| Color | | | | | |
| Surface | | | | | |
| Physical Properties, Injection Molded[2] | | | | | |
| Shore A Hardness, Instantaneous | 79 | 85 | 80 | 80 | 80 |
| Shore A Hardness, Instantaneous | 25 | 25 | 25 | 25 | 25 |
| Tensile Strength, psi | 1460 | 1270 | 1350 | 1360 | 1240 |
| Ultimate Elongation, % | 180 | 160 | 210 | 200 | 250 |
| Tear Strength | | | | | |

TABLE IV-continued
CHLOROBUTYL/PP/CHLOROPRENE DVA'S - CURE SYSTEM COMPARISON

| | Curative Type | | | | |
|---|---|---|---|---|---|
| | Permalux | Resin | | | |
| | A | B | C | D | E |
| Die B (lb/in.) | 190 | 180 | 180 | 190 | 200 |
| Flexural Modulus | | | | | |
| Secant, psi | 7370 | 6520 | 7200 | 7520 | 7580 |
| Feel | Rubbery, Snappy | | | | |
| Compression Set B, Plied | | | | | |
| 22 Hrs. @ 100 C., % | 49 | 46 | 47 | 42 | 47 |
| Fluid Immersion, 70 Hrs. @ 100 C. | | | | | |
| Volume Increase ASTM #3 Oil, % | 60 | 73 | 74 | 76 | 78 |

(1),(2) See notes Table I
(3) Added after resin dispersed

TABLE V
CHLOROBUTYL/PP/CHLOROPRENE DVA'S - COMPARISON OF FILLER AND OIL LEVEL VARIATIONS

| Compound | A | B | C |
|---|---|---|---|
| Component | | | |
| Exxon CHLOROBUTYL 1066 | 22 | 17 | 17 |
| Dypro K222Z PPRC (1.5 MFR) | 22 | 17 | 17 |
| Neoprene W | 22 | 17 | 17 |
| Maglite K | 0.5 | 0.5 | 0.5 |
| Atomite (CaCO3) | 10 | 20 | 25 |
| Circosol 4240 Oil | 15 | 20 | 15 |
| Irganox 1010 | 0.1 | 0.1 | 0.1 |
| DLTDP | 0.2 | 0.2 | 0.2 |
| Stearic Acid | 0.5 | 0.5 | 0.5 |
| Curatives | | | |
| Protox 166 (zinc oxide) | 4.7 | 4.7 | 4.7 |
| TMTDS | 1 | 1 | 1 |
| MBTS | 2 | 2 | 2 |
| Spiral Flow Test | | | |
| Centimeters(1) | 14 | 18 | 14 |
| Physical Properties, Injection Molded(2) | | | |
| Shore A Hardness, Instantaneous | 84 | 76 | 83 |
| Shore D Hardness, Instantaneous | 28 | 23 | 28 |
| Tensile Strength, psi | 1490 | 1080 | 1240 |
| Ultimate Elongation, % | 170 | 160 | 140 |
| Flexural Modulus | | | |
| Secant, psi | 10,500 | 7,100 | 10,100 |
| Compression Set B, Plied | | | |
| 22 hrs @ 100 C. (212 F.) | 55 | 51 | 53 |
| Feel | Snappy, rubbery, matte surfaces | | |
| Color | Brown | | |

(1) Non-standard test for comparison purposes; higher values indicate better mold filling characteristics. Conditions using Boy laboratory injection press: Pressure - 800 psi, barrel temperature 444 F. (230 C.), nozzle - 512 F. (267 C.), mold at 125 F. (52 C.); 13 sec inject., 20 sec. hold.
(2) Boy injection molding machine, temperatures and times as above, pressure adjusted as necessary.

TABLE VI
EFFECT OF PROCESS OIL LEVEL

| DVA | A | B(1) | C |
|---|---|---|---|
| CHLOROBUTYL 1068 | | | 17 |
| CHLOROBUTYL 1066 | 19 | 15.2 | |
| Dypro K222Z PPC (1.5 MFR) | 19 | 15.2 | 17 |
| Neoprene W or WHV | 19 (W) | 15.2 (W) | 17 (WHV) |
| Maglite D | 4 | 3.2 | 2 |
| Atomite (CaCO3) | 15.2 | 12.9 | 10.4 |
| Circosol 4240 Oil | 17 | 33.6 | 30 |
| Irganox 1010 | 0.1 | 0.1 | 0.1 |
| DLTDP | 0.2 | 0.2 | 0.2 |
| Stearic Acid | 0.5 | 0.4 | 0.5 |
| Curatives | | | |
| Zinc Oxide | 5 | 4 | 4 |
| Permalux | 1 | 1.2 | 1 |
| Spiral Flow Test | | | |
| Centimeters | 9 | 29.5 | 25 |
| Appearance | | | |
| Color | Grey/brown | Dark brown | Greyish tan |
| Surface | Some roughness, streaks | Smooth | Smooth |
| Physical Properties, Injection Molded(2) | | | |
| Shore A Hardness, Instantaneous | 86 | 66 | 75 |
| Shore D Hardness, Instantaneous | 29 | 17 | 23 |
| Tensile Strength, psi | 1730 | 980 | 970 |
| Ultimate Elongation, % | 90 | 210 | 170 |
| Feel | Rubbery, snappy | Soft, rubbery, snappy | Rubbery, snappy |
| Compression Set B, Plied | | | |
| 22 Hrs. @ 100 C., % | 50 | 47 | 48 |
| Fluid Immersion, 70 Hrs. @ 100 C. | | | |
| Volume Increase | | | |
| Distilled Water, % | 8 | 13 | 11 |
| ASTM #3 oil, % | 54 | 37 | 47 |

TABLE VII
CHLOROBUTYL/OLEFIN PLASTIC/CHLOROPRENE DVA's - EFFECT OF POLYMER GRADES

| DVA | A | B | C | D | E |
|---|---|---|---|---|---|
| Exxon Chlorobutyl 1066 (52-59 Mooney visc)(1) | 19 | — | — | 18 | — |
| Exxon Chlorobutyl 1068 (72 Mooney visc)(1) | — | 19 | 16 | — | — |
| Exxon Bromobutyl 2244 (72 Mooney visc)(1) | — | — | — | — | 18 |
| Dypro K222Z PPRC (1.5 MFR) | 19 | 19 | 16 | 18 | 18 |
| Neoprene W (42-51 Mooney visc)(1) | 19 | — | — | 18 | 18 |
| Neoprene WHV (106-125 Mooney visc)(1) | — | 19 | 16 | — | — |
| Maglite K | 0.5 | 0.5 | 0.4 | 0.5 | 0.5 |
| Atomite (CaCO3) | 14.2 | 14.2 | 9.4 | 13.4 | 13.4 |

TABLE VII-continued
CHLOROBUTYL/OLEFIN PLASTIC/CHLOROPRENE DVA's - EFFECT OF POLYMER GRADES

| DVA | A | B | C | D | E |
|---|---|---|---|---|---|
| Circosol 4240 Oil | 20 | 20 | 35 | 26.5 | 26.5 |
| Irganox 1010 | 0.1 | 0.1 | 0.1 | 0.1 | 0.1 |
| DLTDP | 0.2 | 0.2 | 0.2 | — | — |
| Stearic Acid | 0.5 | 0.5 | 0.5 | 0.5 | 0.5 |
| Curatives | | | | | |
| SP 1055 Resin | 3.5 | 3.5 | 3.0 | — | — |
| Zinc Oxide | 4[2] | 4[2] | 3.4[2] | 4 | 4 |
| Permalux | — | — | — | 1 | 1 |
| Spiral Flow Test | | | | | |
| Centimeters | 17.5 | 19 | 32 | 22.5 | 22 |
| Appearance | | | | | |
| Color | | | | | |
| Surface | | | | | |
| Feel | | | | | |
| Physical Properties, Injection Molded | | | | | |
| Shore A Hardness, Instantaneous | 80 | 78 | 68 | 78 | 77 |
| Shore D Hardness, Instantaneous | 24 | 25 | 17 | — | — |
| Tensile Strength, psi | 1240 | 1310 | 910 | 1250 | 1260 |
| Ultimate Elongation, % | 250 | 200 | 250 | 210 | 260 |
| Flexural Modulus | | | | | |
| Secant, psi | 7,500 | 7,600 | 3,500 | 5,700 | 5,600 |
| Compression Set B, Plied | | | | | |
| 22 hrs @ 100 C. (212 F.) | 47 | 48 | 49 | 62 | 59 |
| Fluid Immersion, 70 hrs @ 100 C. | | | | | |
| Volume Increase: | | | | | |
| Distilled Water, % | — | — | — | 12 | 11 |
| ASTM #3 oil, % | 78 | 76 | 57 | 52 | 55 |

[1]Measured at 100° C.
[2]Added after curing resin dispersed.

TABLE VIII
CHLOROBUTYL/OLEFIN PLASTIC/ CHLOROPRENE DVA'S - EFFECT OF MIXED OLEFIN RESINS

| Component | A | B |
|---|---|---|
| Exxon CHLOROBUTYL 1066 | 22 | 22 |
| Dypro K222Z PPRC (1.5 MFR) | 22 | 15 |
| Polybutylene DP 8010 (0.2 MI copolymer) | — | 7 |
| Neoprene W | 22 | 22 |
| Maglite K | 0.5 | 0.5 |
| Atomite (CaCO$_3$) | 10 | 10 |
| Circosol 4240 Oil | 15 | 15 |
| Stearic Acid | 0.5 | 0.5 |
| Irganox 1010 | 0.1 | 0.2 |
| DLTDP | 0.2 | 0.2 |
| Curatives | | |
| Protox 166 (zinc oxide) | 4.7 | 4.7 |
| TMTDS | 1 | 1 |
| MBTS | 2 | 2 |
| Flow Properties | | |
| Spiral Flow test, centimeters[1] | 14 | 16 |
| Physical Properties, Injection Molded Dumbbell[1] | | |
| Shore A Hardness, Instantaneous | 84 | 76 |
| Shore D Hardness, Instantaneous | 28 | 21 |
| Tensile Strength, psi | 1490 | 1090 |
| Ultimate Elongation, % | 170 | 190 |
| Flexural Modulus | | |
| Secant, psi | 10,500 | 5,260 |
| Compression Set B, Plied | | |
| 22 hrs @ 100 C. (212 F.) | 55 | 48 |
| Feel | Snappy, rubbery, matte surfaces | |
| Color | Brown | Brown |

TABLE IX
CHLOROBUTYL/PP/CHLOROPRENE DVA'S - EFFECT OF OIL TYPE

| Component | A | B | C |
|---|---|---|---|
| Exxon CHLOROBUTYL 1066 | 17 | 17 | 17 |
| Dypro K222Z PPRC (1.5 MFR) | 17 | 17 | 17 |
| Neoprene W | 17 | 17 | 17 |
| Maglite K | 0.5 | 0.5 | 0.5 |
| Atomite (CaCO$_3$) | 20 | 20 | 25 |
| Circosol 4240 oil (172° F. Aniline Pt, 2525 ssu @ 100 F.) | 20 | — | — |
| Flexon 766 oil (219° F. Aniline Pt, 503 ssu @ 100 F.) | — | 20[2] | — |
| Flexon 391 oil (124° F. Aniline Pt, 4010 ssu @ 100 F.) | — | — | 20 |
| Irganox 1010 | 0.1 | 0.1 | 0.1 |
| DLTDP | 0.2 | 0.2 | 0.2 |
| Stearic Acid | 0.5 | 0.5 | 0.5 |
| Curatives | | | |
| Protox 166 (zinc oxide) | 4.7 | 4.7 | 4.7 |
| TMTDS | 1 | 1 | 1 |
| MBTS | 2 | 2 | 2 |
| Spiral Flow Test | | | |
| Centimeters[1] | 18 | 20 | 17 |
| Physical Properties, Injection Molded[1] | | | |
| Shore A Hardness, Instantaneous | 76 | 76 | 80 |
| Shore D Hardness, Instantaneous | 23 | 21 | 23 |
| Tensile Strength, psi | 1080 | 1020 | 1580 |
| Ultimate Elongation, % | 156 | 186 | 70 |
| Flexural Modulus | | | |
| Secant, psi | 7,100 | 6,900 | 10,100 |
| Compression Set B, Plied | | | |
| 22 hrs @ 100 C. (212 F.) | 51 | 53 | 52 |
| Feel | Snappy, rubbery, matte surfaces | | |
| Color | Brown | Brown | Brown |

[1]Boy Injection Molding Machine, see details Table I footnotes.
[2]Flexon 766, the highest aniline point oil was significantly slower incorporating into the batch than the other two oils.

TABLE X
INGREDIENT LIST

| | | |
|---|---|---|
| CHLOROBUTYL | Chlorinated isoprene - isobutylene copolymer, 51–60 ML (1 + 8) 100° C. | Exxon Chemical Americas |
| Bromobutyl 2224 | Brominated isoprene - isobutylene copolymer, 42–52 ML (1 + 8) 125° C. | Exxon Chemical Americas |
| CHLOROBUTYL 1068 | Chlorinated isoprene - isobutylene copolymer, 45–52 ML (1 + 8) 125° C. | Exxon Chemical Americas |
| Flexon 766 | Naphthenic process oil ASTM Type 104A | Exxon Company USA |
| Atomite | Natural ground calcium carbonate, mean particle size 3 microns | Thompson, Weinman & Company |
| Maglite D, K | Magnesium oxide, highly active | C. P. Hall, Merck |

TABLE X-continued
INGREDIENT LIST·

|  | Magnesium oxide, low actively | Chemical Co. |
|---|---|---|
| TMTDS | Tetramethyl Thiuram Disulfide | Several |
| MBTS | 2,2 Di-Benzothiazyl Disulfide | Several |
| Dypro K222Z | Reactor copolymer polypropylene, 1.5 MFR (Condition L) | Cosden Oil & Chemical Co. |
| Flexon 391 | Aromatic Process Oil ASTM Type 102 | Exxon Company USA |
| DLTDP | Dilauryl thiodipropionate | W. R. Grace & Co. |
| Weston 619 | Distearyl Pentaerythritol diphosphite | Borg-Warner Chemical, Inc. |
| Neoprene W | Polychloroprene Rubber 42–52 ML (1 + 4) 100° C. | DuPont Elastomers Division |
| Neoprene WHV | Polychloroprene Rubber 106–125 ML (1 + 4) 100° C. | Dupont Elastomers Division |
| Circosol 4240 Oil | Naphthenic Process Oil ASTM Type 103 | Sun Petroleum Marketing Company |
| SP 1045 | Alkyl phenol-formaldehyde resin | Schenectady Chem. |
| SP 1055 | Brominated alkyl phenal resin | Schenectady Chem. |
| Protox 166 | Zinc Oxide (propionic acid treated) | Gulf & Western Nat'l Resources Group |
| Permalux | Di-ortho quanidine salt of dicathechol borate | DuPont Elastomers Chemicals Dept. |
| Polybutylene DP 8010 | Polybutylene Copolymer 0.2 MI (E) 102.5° C. m.p. development product | Shell Chemical Co. |

What is claimed is:

1. A thermoplastic composition comprising a polymer blend wherein the polymer blend comprises a polyolefin resin, a halogenated butyl rubber and a polychloroprene rubber, said rubbers being co-vulcanized by dynamic vulcanization in the presence of the polyolefin resin.

2. The composition according to claim 1 having a process oil incorporated in the composition.

3. The composition according to claim 2 wherein the oil is incorporated into the composition at a weight ratio of oil to rubber of about 0.3/1 to about 1.3/1.

4. The composition according to claim 3 wherein the weight ratio is about 0.4/1 to about 1/1.

5. The composition according to claim 4 wherein the weight ratio is 0.5/1 to about 0.75/1.

6. The composition according to claim 1 wherein a process oil is incorporated into the composition at about 15 wt% to about 35 wt% based on the overall composition.

7. The composition according to claim 6 wherein the oil is incorporated at about 20 wt% to about 25 wt%.

8. The composition according to claim 1 wherein the polyolefin resin, halogenated butyl rubber and the polychloroprene are each incorporated into the composition in substantially equal proportions.

9. The composition according to claim 1 wherein the polyolefin is polypropylene or high density polyethylene (HDPE).

10. The composition according to claim 9 wherein the polyolefin is polypropylene.

11. The composition according to claim 1 wherein the polyolefin comprises a blend of polypropylene or HDPE with at least one optional polyolefin resin.

12. The composition according to claim 11 wherein the optional polyolefin is polybutene.

13. The composition according to claim 1 wherein a filler is incorporated into the composition.

14. The composition according to claim 13 wherein the filler is an inorganic filler.

15. The composition according to claim 14 wherein the inorganic filler is $CaCO_3$.

16. The composition according to claim 13 wherein the filler is incorporated into the composition at about 10 to about 30 wt% based on the over composition.

17. The composition according to claim 1 wherein the polymer blend comprises about 40 to about 70 wt% of the overall composition and the remainder of the composition comprises process oil, fillers and curatives.

18. The composition according to claim 17 wherein the polyolefin comprises about 12 to about 35 wt% of the overall composition.

19. The composition according to claim 18 wherein the polyolefin comprises about 13.5 wt% to about 25 wt% of the overall composition.

20. The composition according to claim 19 wherein the polyolefin comprises about 15 to about 22 wt% of the overall composition.

21. The composition according to claim 20 wherein the polyolefin comprises about 16 to about 19 wt% of the overall composition.

22. The composition according to claim 17 wherein the polyolefin resin, the halogenated butyl rubber and the polychloroprene are each incorporated into the composition at substantially equal proportions.

23. The composition according to claim 1 wherein the halogenated butyl rubber is chlorinated butyl rubber.

24. The composition according to claim 1 wherein the halogenated butyl rubber is brominated butyl rubber.

25. The composition according to claim 1 wherein the halogenated butyl rubber comprises at least 25 wt% based on the halogenated butyl rubber plus polychloroprene.

26. The composition according to claim 1 wherein the polychloroprene comprises at least 35 wt% based on the halogenated butyl rubber and polychloroprene.

27. The composition according to claim 1 wherein the halogenated butyl rubber comprises about 35 to about 65 wt% based on the halogenated butyl rubber plus polychloroprene.

28. A method for preparing compatible blends of a polyolefin resin and polychloroprene rubber wherein said polychloroprene rubber is incompatible with said polyolefin resin, which comprises blending the polyolefin resin and polychloroprene rubber with a halogenated butyl rubber wherein said halogenated butyl rubber is compatible with said resin, said rubbers being co-vulcanized by dynamic vulcanization in the presence of said polyolefin resin.

29. The method according to claim 28 wherein the halogenated butyl rubber comprises at least 25 wt% of the rubber based on the polychloroprene rubber plus halogenated butyl rubber.

30. The method according to claim 28 wherein the polyolefin is polypropylene or HDPE.

31. The method according to claim 28 wherein the halogenated butyl rubber is chlorinated butyl rubber.

* * * * *